March 3, 1959     V. A. BARNHART     2,875,497
APPARATUS FOR PRODUCING HOLLOW STRUCTURAL CLAY BUILDING UNITS
Filed Jan. 13, 1956     2 Sheets-Sheet 1
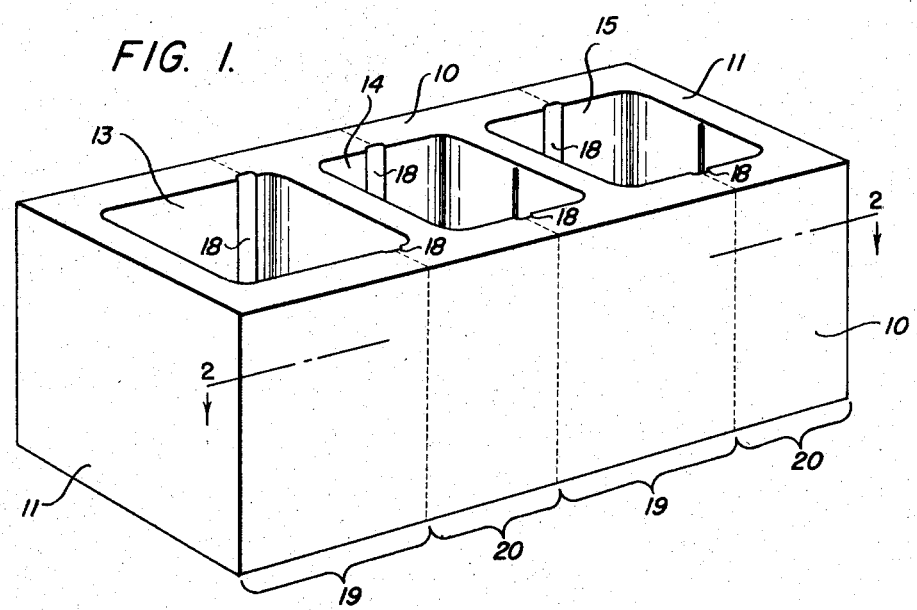
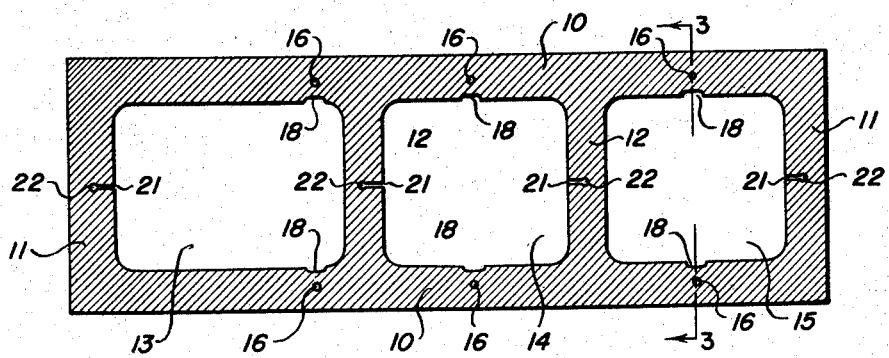
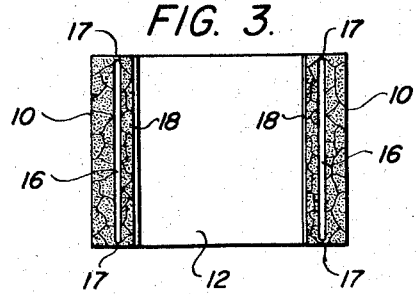
Inventor:
VERN A. BARNHART
By
Attorneys.

March 3, 1959 V. A. BARNHART 2,875,497
APPARATUS FOR PRODUCING HOLLOW STRUCTURAL CLAY BUILDING UNITS
Filed Jan. 13, 1956 2 Sheets-Sheet 2
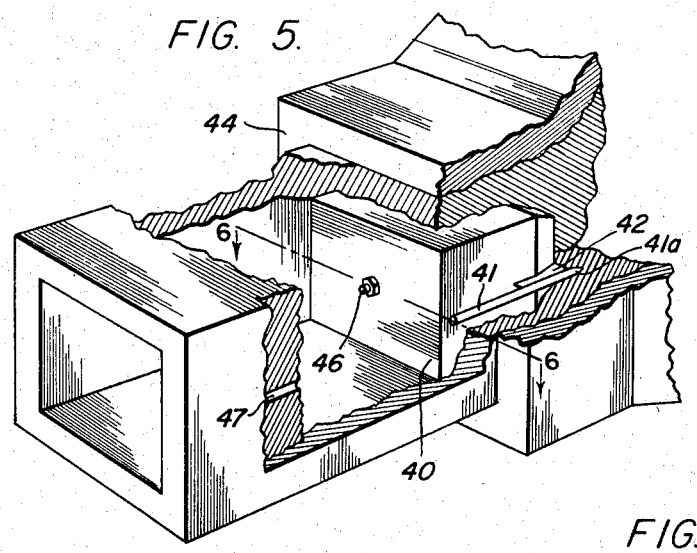
FIG. 5.
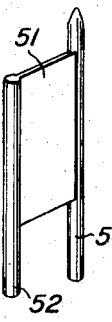
FIG. 11.
FIG. 8.
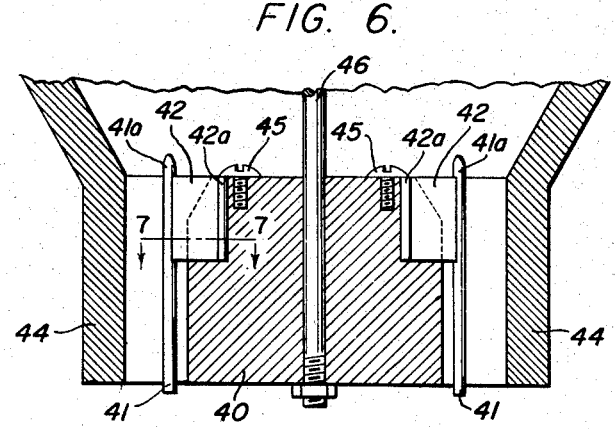
FIG. 6.
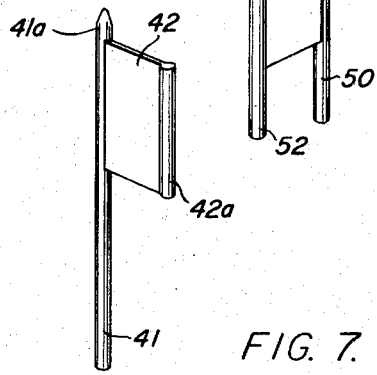
FIG. 7.
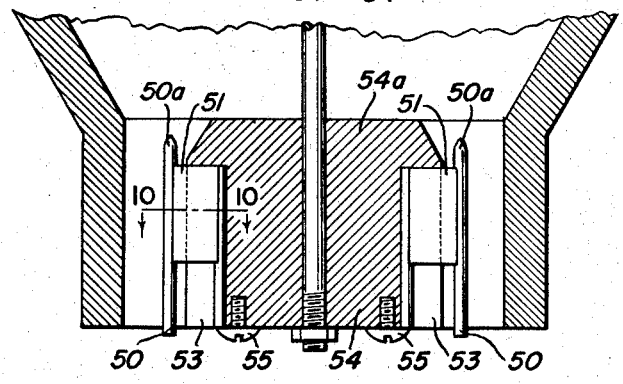
FIG. 9.
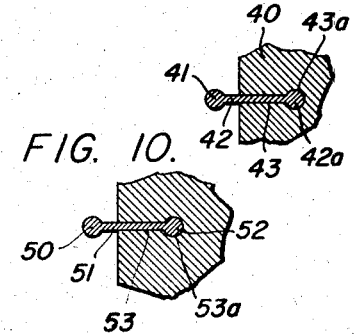
FIG. 10.
INVENTOR.
VERN A. BARNHART
ATTORNEYS

United States Patent Office 2,875,497
Patented Mar. 3, 1959

2,875,497

APPARATUS FOR PRODUCING HOLLOW STRUCTURAL CLAY BUILDING UNITS

Vern A. Barnhart, Athens, Ohio

Application January 13, 1956, Serial No. 558,953

14 Claims. (Cl. 25—17)

This invention relates to apparatus for producing fired hollow building units of structural clay, as used extensively in masonry building construction. Often such units are referred to as hollow structural tile.

The invention is concerned particularly with the provision of apparatus for producing to best advantage the unique hollow structural clay building unit claimed as such in my copending application for patent Serial No. 109,354, filed August 9, 1949, entitled "Hollow Structural Clay Building Unit," now Patent Number 2,737,801 issued March 13, 1956. The present application constitutes a continuation-in-part of that earlier application.

The advantages of hollow structural clay building units in the art of building construction are well-known. There are disadvantages, however, which have been annoying and have limited their general usefulness.

A major disadvantage has been the difficulty of breaking a unit into smaller pieces needed from time to time during the progress of building construction for completing a laid course of units to a given dimension. As ordinarily formed, the walls of such units will not break cleanly when an attempt is made by a mason to separate the block along a desired line of cleavage. Thus, much time and material is wasted on any given job.

This difficulty has been overcome in the past by the provision of kerfs in the walls of the unit, whereby predetermined fracture planes have been established during manufacture. This, however, has produced highly undesirable results in another direction, namely, weakening of the walls of the unit and impairment of its structural strength. This has been particularly serious because of the tendency for a kerf to be uncontrollably extended during the firing stage of the manufacture, resulting in a marked weakening of the walls of the unit. Accordingly, the practice of forming a unit with kerfs has never been adopted generally, and is frowned upon in the trade.

A generally satisfactory way of overcoming the difficulty has been the provision of closely spaced cross-walls or webs immediately adjacent a desired line of cleavage along the main walls of the unit, so that the unit could be struck a blow at that line to produce an uneven but fairly straight fracture confined to the narrow strip of the major walls lying between the cross-walls. While this has given fair results in practice, the weight added to a unit by the provision of structurally-unnecessary cross-walls is excessive. It has proven to be practical from an economic standpoint only in special instances.

The hollow structural clay building unit of my aforementioned Patent Number 2,737,801 is provided with predetermined lines of cleavage capable of producing straight and clean fracture planes when the unit is properly struck by a mason, without imparting the structural strength of the unit nor adding to its weight. The predetermined lines of cleavage are established by elongate passages of restricted cross-section extending within and lengthwise of appropriate walls of the unit along predetermined desired lines of cleavage of such walls. I have found that only one of such passages, disposed approximately centrally of the thickness of a wall, is necessary in order to produce a clean fracture plane through that wall along the line of extension of the passage. This passage is preferably of tubular configuration, having a diameter substantially no greater than one-third the thickness of the wall. The diameter is, however, advantageously as small as is practical to produce, since the important thing is establishing a laterally closed break within the wall along the desired line of cleavage, rather than reducing the thickness of the wall along such line. Thus, I have found that a passage having a diameter of approximately ⅛ of an inch is very satisfactory for a wall thickness of ¾ of an inch.

I have found that the most satisfactory method of producing units having such small passages extending longitudinally within the walls thereof is by the customary process of extrusion of the plastic clay through a die, severing of individual units from the resulting clay column, and firing such units.

Core pins, anchored to the die core in cantilever fashion by means of narrow bridge pieces set back from the discharge end of the die, serve to form the desired passages.

In the present method of producing these unique hollow structural clay building units, the severing of individual units from the extruded clay column as customarily accomplished by a conventional wire cutter, drags sufficient clay over what would otherwise be open ends of the cleavage passages to close such ends, thereby producing what might be termed a "sealed" unit having the outward appearance of a conventional unit of the type. Such sealing of the cleavage passages within the walls of the unit prevents, in use, entry thereinto of moisture, and has been found to aid in proper burning of the unit during the firing step in its production.

A sharp blow by a hammer directly upon the unit at the location of a cleavage passage in a wall, or upon a bricklayer's chisel or a heavy spike held against the unit at such location, the same being repeated at the opposite side of the unit, will effectively break the entire unit along a fracture plane comprehending parallel cleavage passages disposed in those respective walls concerned in the particular break desired.

Further objects and features of the invention will become apparent from the following detailed description of the presently preferred specific forms of apparatus illustrated by way of example in the accompanying drawings.

In the drawings:

Fig. 1 represents a perspective view of one form of the unique hollow structural clay building unit under consideration;

Fig. 2, a horizontal section taken on the line 2—2 of Fig. 1;

Fig. 3, an elevation of a section of a unit fractured along the line 3—3 of Fig. 2, and showing the rough fracture surface;

Fig. 4, a perspective view drawn to a reduced scale, of a core block of the invention utilized as part of a conventional extrusion die for producing the unit of the foregoing figures;

Fig. 5, a fragmentary perspective view of a somewhat different form of core block fitted in a die being used to extrude a simple form of hollow structural clay building unit;

Fig. 6, a fragmentary horizontal section taken on the line 6—6 of Fig. 5, showing only the core block and die;

Fig. 7, a fragmentary detail section taken on the line 7—7 of Fig. 6;

Fig. 8, a perspective view of the core pin and mount of Figs. 5–7 drawn to a somewhat enlarged scale;

Fig. 9, a view corresponding to that of Fig. 6, but illustrating a somewhat different core block construction;

Fig. 10, a view corresponding to that of Fig. 7, but taken on the line 10—10 of Fig. 9; and Fig. 11, a view corresponding to that of Fig. 8, but illustrating the core pin and mount of Figs. 9 and 10.

Referring to the drawings:

The hollow structural clay building unit of Figs. 1, 2, and 3 is that of my afore-mentioned Patent Number 2,737,801. As such, it comprises longitudinal walls 10, opposite end walls 11, and mutually spaced webs 12 which divide the hollow interior of the unit into sections 13, 14, and 15.

Cleavage passages 16, closed at their ends by means of clay sheets or caps 17, Fig. 3, are provided by means of the apparatus and the method of the present invention. Such cleavage passages are visually indicated by indentations 18.

As so constituted, the unit may be easily broken into alternate long and short sections, indicated 19 and 20, respectively, to provide for both half and third bonding in building construction, as is more fully explained in my said copending application.

For the purpose of dividing the unit longitudinally, kerfs 21, terminating in respective, coextensive cleavage passages 22, are provided along the vertical, longitudinal, central axis of the unit.

The cleavage passages are advantageously formed by core pins carried by and auxiliary to the customary core parts of a conventional extrusion die. A core part adapted for use in the production of units of the foregoing particular type, is illustrated in Fig. 4. The core block 25 carries at one set of opposite sides thereof elongate core pins 26 by means of respective short and thin bridge pieces 27, which are anchored within suitable receiving slots formed at the feed end of the core block. The greater part of the length of the core pins, extending toward and preferably completely up to the discharge face of the core block, are cantilever to the minor bridge-supported portions, so that the extrusion pressure within the die will seal the thin breaks made in the clay column by the respective bridge pieces 27. Such core pins 26 form the cleavage passages 16, the particular core block illustrated being used to form either the hollow 14 or the hollow 15. Any suitable projections such as the set screws 28, may be utilized to form the ribbon-like indentations 18.

Carried by the core block 25 at the other set of opposite sides thereof and proximate the discharge face of the die are core pins 29, which are secured along their lengths to respective kerf-forming bridge pieces 30. These form the respective combinations of kerfs 21 and terminal passages 22.

Conventional wire cutters are employed to cut the clay column into individual units. In the use of same, I have found that the wire drags sufficient clay over the openings of the cleavage passages to form the end closure sheets or caps 17 for the cleavage passages 16, as well as similar end closure sheets or caps for the kerfs 21 and terminal passages 22. This holds true for passages up to as large as approximately ¼ inch, which size passages may be advantageously utilized in the larger units where wall thicknesses are great enough to accommodate them without appreciable structural weakening.

Conventional cutters of the above type ordinarily use piano wire of high tensile strength. For the present purpose, the diameter of the wire will depend upon the grind and plasticity of the clay. A heavier wire is required for coarser grinds and stiffer plasticity, while finer wire is satisfactory for the finer grinds and more plastic clays. This is well-known in the art. Little difficulty is experienced in selecting an appropriate wire for closing the cleavage passages in any given instance of the present invention. Wire which would normally be used is ordinarily satisfactory. The diameter of the cleavage passages concerned may, however, require some modification, particularly where the larger diameters of cleavage passage are utilized. In such instances, a heavier wire is necessary to drag the plastic clay across, and so close the passage opening.

Core blocks of the foregoing type have served satisfactorily, but have been found to possess a disadvantage over periods of long use. There is a tendency for the bridge pieces 27 to loosen and produce a cleavage passage not in conformity with requirements. Improved constructions are illustrated in Figs. 5 through 11 in connection with extrusion apparatus for producing a simple structural clay building unit possessing only a single void.

The construction of Figs. 5–8 comprises a core block 40 to which core pins 41 are securely anchored by means of respective bridge pieces 42 having enlarged backbone or anchor members 42a for both reinforcing and anchoring purposes. The bridge piece 42 of each core pin assembly is received by and slides snugly into a receiving slot 43, Fig. 7, extending longitudinally of the block from the feed end thereof, such slot being configurated with an enlarged inner end 43a for accommodating and closely hugging the enlarged portion 42a of the bridge piece. In this way, each pin 41 is firmly held against deviation from its pre-established position relative to the core block 40 and die walls 44.

For the purpose of securing the core pin assemblies tightly in their slots 43, respective holding screws 45 are advantageously driven into tapped receiving holes in the feed end of the core block, so that their heads overlap the backbone or anchor members 42a of the respective core pin assemblies. Use of screws for this purpose facilitates replacement of any core pin assemblies which become worn over the course of time. If desired, however, and particularly in instances where the core pins and bridge pieces are fabricated from especially hard steel or the like, thereby being largely resistant to wear, welding of the exposed end of the bridge piece and enlarged member thereof to the core block may be satisfactorily utilized in place of the screws 45. In fact, welding is preferable in all instances where the clay being worked is so abrasive as to excessively wear the heads of screws 45.

It will be noted that, in this embodiment, the core pins 41 are provided with relatively short, pointed, pilot ends 41a which project beyond the respective bridge pieces 42. This has been found to be advantageous both from the standpoint of decreasing wear on the junction between bridge piece and core pin and from the standpoint of smoothness of the resulting cleavage passage.

The core pin assemblies as above described may be fabricated by welding pre-formed bridge pieces to pre-formed core pins, the enlarged backbone or anchor members 42a being advantageously formed integrally with the bridge piece proper. However, such assemblies may be and preferably are formed entirely integrally by a die stamping operation.

The core block as thus constructed is secured within the hollow die part 44 in customary fashion, as by means of a carrier rod 46, Figs. 5 and 6.

The conventional wire cutter (not shown) serves to drag clay over and close the ends of the cleavage passages 47 formed by the core pins 41 in the same manner as aforedescribed with respect to the preceding embodiment.

The construction of Figs. 9–11 is quite similar to the immediately preceding embodiment, with the exception that, for the purpose of minimizing any tendency toward wear, the core pin assemblies are mounted in the core block from the discharge end thereof rather than the feed end.

As illustrated, each core pin assembly comprises a core pin 50, a bridge piece 51, and an anchor pin 52.

The receiving slots 53 open into the discharge end of the core block 54, rather than into the feed end thereof, and extend along the length of such core block to a location somewhat short of the feed end thereof. The anchor pins 52 are of length equal to the length of the receiving slots 53, so that they terminate flush with the discharge end of such block when the core pin assemblies are installed as illustrated in Fig. 9. Thus, holding screws 55, similar to those indicated 45 in Fig. 6, may be effectively utilized, as may also the welding technique explained hereinbefore.

It will be noted that, even though the receiving slots 53 are open laterally along a portion of their lengths following insertion of the core pin assemblies, the enlarged inner portions 53 of such slots serve to retain the anchor pins tightly in position against any lateral outward force exerted on the discharge end portions of the core pins 50 during the extrusion operations. In this instance, pilot portions 50a of the core pins extend rearwardly with the feed end 54a of the core block, and co-operate with the latter in initially forming the advancing clay extrudate.

Whereas this invention is here illustrated and described with respect to specific embodiments thereof, it should be realized that changes may be made within the scope of the following claims, without departing from the essential contributions which I have made to the art.

I claim:

1. Apparatus for producing hollow structural clay building units, comprising an extrusion die; at least one core block operably disposed within and spaced apart from the walls of said die, for forming a void during the extrusion process, said core block having a front face and a rear face; at least one core pin disposed laterally of said core block and extending longitudinally thereof intermediate the core block and the die, said pin being of attenuate formation as compared with said core block; a bridge piece rigidly secured to said core block and to said core pin, as a cantilever support for the latter said bridge piece being spaced sufficiently far from the front face of the core block to insure sealing of the clay between core block and the core pin, and said core pin extending at least substantially to the front face of the core block; and means for extruding plastic clay through said die and around said core block.

2. The apparatus of claim 1, wherein the core block is slotted longitudinally to receive one end portion of the bridge piece; and wherein means are provided securing said end portion of the bridge piece within the receiving slot of the core block.

3. The apparatus of claim 2, wherein the securing means includes an enlarged backbone member formed as a longitudinally extending terminus of the said end portion of the bridge piece; and wherein the core block is correspondingly slotted for snugly receiving said end portion with its said backbone member.

4. The apparatus of claim 3, wherein the securing means also includes holding means attached to the core block at the entrance of the receiving slot.

5. The apparatus of claim 4, wherein the holding means is a screw threaded into the core block and having its head overlapping the end of the backbone member of the bridge piece.

6. The apparatus of claim 5, wherein the receiving slot has its opening and the holding screw is located at the discharge end of the core block.

7. A core block assembly for use with an extrusion die in the production of hollow structural clay building units, comprising a core block having a front face and a rear face; at least one core pin disposed laterally of said core block and extending longitudinally thereof in spaced relationship therewith, said pin being of attenuate formation as compared with said core block; and a bridge piece rigidly secured to said core block and to said core pin, as a cantilever support for the latter, said bridge piece being spaced sufficiently far from the front face of the core block to insure sealing of the clay between core block and the core pin, and said core pin extending at least substantially to the front face of the core block.

8. The apparatus of claim 7, wherein the core block is slotted longitudinally to receive one end portion of the bridge piece; and wherein means are provided securing said end portion of the bridge piece within the receiving slot of the core block.

9. The apparatus of claim 8, wherein the securing means includes an enlarged backbone member formed as a longitudinally extending terminus of the said end portion of the bridge piece; and wherein the core block is correspondingly slotted for snugly receiving said end portion with its said backbone member.

10. The apparatus of claim 9, wherein the securing means also includes holding means attached to the core block at the entrance of the receiving slot.

11. The apparatus of claim 10, wherein the holding means is a screw threaded into the core block and having its head overlapping the end of the backbone member of the bridge piece.

12. The apparatus of claim 11, wherein the receiving slot has its opening and the holding screw is located at the discharge end of the core block.

13. A core pin assembly for use with a core block of an extrusion die for the production of hollow structural clay building units, comprising an elongate core pin, and a relatively short bridge piece rigidly secured to said core pin laterally thereof and extending longitudinally therewith, said bridge piece being of flat plate formation and thin relative to said core pin, and said core pin having a pointed pilot end in advance of the bridge piece.

14. The core pin assembly of claim 13, wherein the edge of the bridge piece opposite the edge which is secured to the pin is provided with an enlarged backbone member extending longitudinally thereof in parallel relationship with the core pin.

References Cited in the file of this patent

UNITED STATES PATENTS

| | | |
|---|---|---|
| 663,141 | Walker et al. | Dec. 4, 1900 |
| 720,535 | Schwechler | Feb. 10, 1903 |
| 1,193,663 | Boyd et al. | Aug. 8, 1916 |
| 1,508,773 | Brown | Sept. 16, 1924 |
| 1,738,665 | Ober | Dec. 10, 1929 |
| 1,849,431 | Mayhew | Mar. 15, 1932 |
| 1,872,522 | Stuckey | Aug. 16, 1932 |
| 1,976,858 | Ritter | Oct. 16, 1934 |
| 2,209,643 | Chamblin | July 30, 1940 |
| 2,230,309 | Reed | Feb. 4, 1941 |